May 1, 1945.  A. L. RUMMELSBURG  2,374,958
METHOD FOR BORON FLUORIDE RECOVERY
Filed Feb. 13, 1942
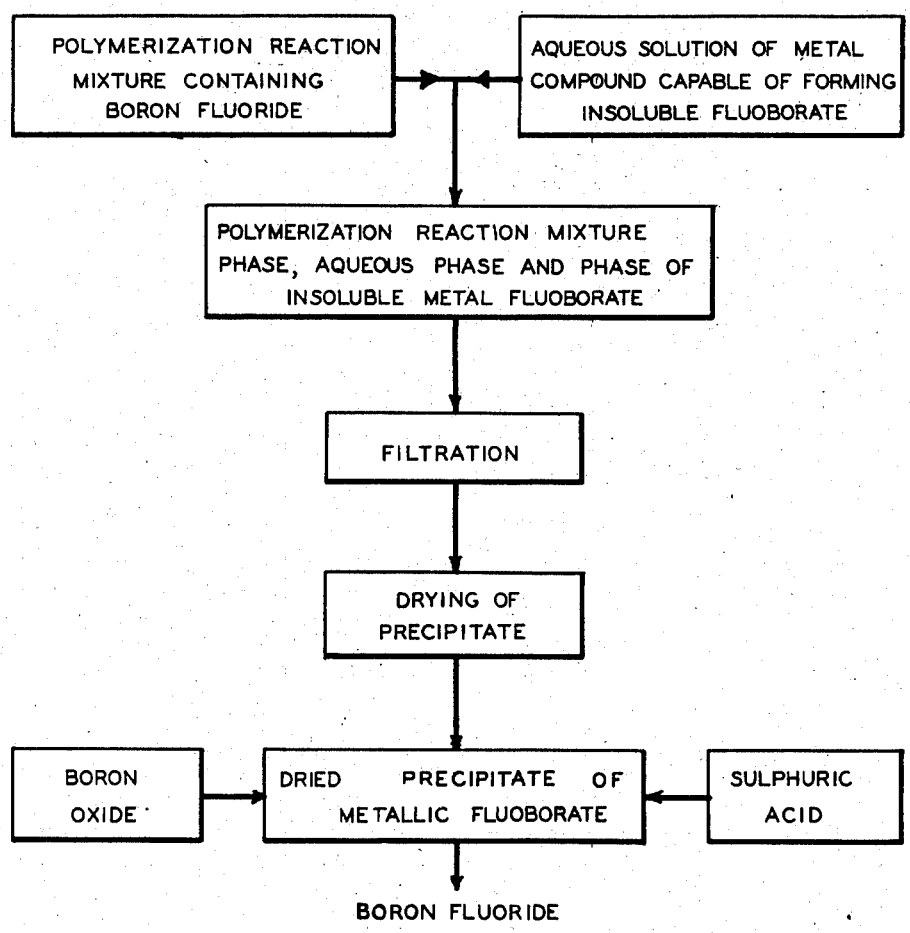

Patented May 1, 1945

2,374,958

UNITED STATES PATENT OFFICE 2,374,958

METHOD OF BORON FLUORIDE RECOVERY

Alfred L. Rummelsburg, Wilmington, Del., assignor to Hercules Powder Company, Wilmington, Del., a corporation of Delaware Application February 13, 1942, Serial No. 430,746

9 Claims. (Cl. 23—205)

This invention relates to the recovery of boron fluoride and, more particularly, to the recovery of boron fluoride from polymerization mixtures containing the same.

Boron fluoride has found important use as a polymerization catalyst for organic materials, particularly rosins and rosin esters. Thus, a method is well known for the polymerization of rosins and rosin esters by dissolving the rosin or rosin ester in a suitable inert organic solvent and treating the solution with boron fluoride. After the polymerization has taken place to the desired extent, the boron fluoride must be recovered from the reaction mixture in order to yield a satisfactory polymerized product. Also, in order for such a polymerization process to be efficient and economical, it is necessary that suitable means be employed to remove the boron fluoride from the polymerization reaction mixture and to recover it in such form that it may again be used as a polymerization catalyst.

Now, in accordance with this invention, boron fluoride is recovered from water-immiscible polymerization reaction mixtures containing the same by contacting the mixture with an aqueous solution of a metal compound capable of forming a salt of fluoboric acid which is insoluble in both the reaction mixture and in the aqueous solution, separating and drying the insoluble salt and reacting the salt in an admixture with boron oxide and sulfuric acid. A flow sheet of this method for the recovery of boron fluoride is contained in the drawing which is believed to be self-explanatory.

Having now indicated in a general way the nature and purpose of this invention, the following example is given to illustrate this novel method for the recovery of boron fluoride. In the example, the term "parts" represents weight units, unless otherwise indicated.

Example 1

Two hundred fifty parts of K wood rosin were dissolved in 350 parts of benzene. Fifty parts of boron fluoride were then absorbed in the solution at a temperature of between 10 and 30° C. during a period of 25 minutes with vigorous agitation. This reaction mixture was then vigorously shaken at 60° C. with an aqueous solution containing 100 parts of potassium chloride and 1000 parts of water. Precipitation from the aqueous solution occurred immediately. The entire reaction mixture was then cooled to 25° C. and filtered several hours later. The precipitate, potassium fluoborate, was washed with 200 parts of benzene in order to remove any occluded polymerized rosin solution, after which the precipitate was washed with 100 parts of water and dried in a vacuum over sulfuric acid. This procedure yielded a precipitate of 60 parts of potassium fluoborate, which was about 86% of the theoretical yield based upon the amount of boron fluoride in the polymerization mixture. This washed and dried precipitate of potassium fluoborate was then reacted with sulfuric acid and boron oxide according to procedures well known in the art to produce recovery of boron fluoride.

The example illustrates the recovery of boron fluoride from a mixture in which rosin was polymerized. The method of this invention also produces highly efficient recovery of boron fluoride from other types of reaction mixtures in which all the constituents other than the boron fluoride are water-insoluble, such as polymerization mixtures of rosin esters, unsaturated fatty acids, esters of unsaturated fatty acids, natural resins, condensation mixtures of terpenes with phenol, condensation mixtures of rosin with phenol, etc.

The polymerization reaction mixture may be washed with an aqueous solution of any metallic compound which is capable of forming a fluoborate that is insoluble in water and in the reaction mixture. Potassium chloride was used in the example, but the chlorides of rubidium and cesium as well as the nitrates and sulfates of potassium, rubidium and cesium are also suitable precipitating agents. Precipitation may be accomplished less preferably by the use of hydroxides and carbonates of potassium, rubidium and cesium. In the precipitation, it is preferable to use an excess of the precipitating salt and to precipitate at a reduced temperature in order to produce the maximum yield of insoluble fluoborate. The rate of crystallization may be increased by agitation, by seeding, or by a combination of agitation and seeding. The concentration of the salt in the aqueous solution may vary within wide limits and will depend upon the particular salt dissolved in the water, the specific reaction mixture contacted with the aqueous solution, the concentration of boron fluoride in the polymerization mixture and upon other factors obvious to those skilled in the art.

After the precipitate of insoluble fluoborate has been formed, it is separated by any suitable procedure, such as filtration. As shown in the example, the precipitate is then preferably washed with a non-solvent, such as benzene, in order to remove any occluded portions of the polymerization mixture. The precipitate is then water washed and dried, after which boron fluoride may be recovered from the washed and dried insoluble salt of fluoboric acid by any of the procedures known in the art such as, for example, by the reaction of the precipitate with about 6 mols of boron oxide per mol of precipitate in admixture with an excess of sulfuric acid.

The method of this invention is a useful and valuable procedure for the recovery of boron fluoride from a polymerization reaction mixture of the type described above. By employing this process, boron fluoride is removed from a polymerization mixture much more efficiently than by straight water washing so that substantially all the boron fluoride may be removed from the mixture and subsequently recovered in a form suitable for further use as a catalyst. Furthermore, prior art processes for the removal of boron fluoride by metathetical reactions require prolonged heating periods whereas the process described herein requires the use of only a very short heating period, and the reaction may even be carried out efficiently at room temperature if desired.

What I claim and desire to protect by Letters Patent is:

1. The method for the recovery of boron fluoride from a water-insoluble polymerization reaction mixture dissolved in an inert water-immiscible organic solvent and containing boron fluoride which comprises contacting said mixture with an aqueous solution of a compound of a metal selected from the group consisting of potassium, rubidium and cesium capable of forming the fluoborate of the said metal under such conditions that the insoluble fluoborate of said metal is formed and precipitated, separating and drying the precipitate so formed and reacting the precipitate in admixture with boron oxide and sulfuric acid, whereby the boron fluoride is recovered.

2. The method for the recovery of boron fluoride from a water-insoluble polymerization reaction mixture dissolved in an inert water-immiscible organic solvent and containing boron fluoride which comprises contacting said mixture with an aqueous solution of a metal compound selected from the group consisting of hydroxides, carbonates and strong mineral acid salts of a metal selected from the group consisting of potassium, rubidium and cesium under such conditions that the insoluble fluoborate of said metal is formed and precipitated, separating and drying the precipitate so formed and reacting the precipitate in admixture with boron oxide and sulfuric acid, whereby the boron fluoride is recovered.

3. The method for the recovery of boron fluoride from a water-insoluble polymerization reaction mixture dissolved in an inert water-immiscible organic solvent and containing boron fluoride which comprises contacting said mixture with an aqueous solution of a salt of a strong mineral acid and a metal selected from the group consisting of potassium, rubidium and cesium under such conditions that the insoluble fluoborate of said metal is formed and precipitated, separating and drying the precipitate so formed and reacting the precipitate in admixture with boron oxide and sulfuric acid, whereby the boron fluoride is recovered.

4. The method for the recovery of boron fluoride from a water-insoluble polymerization reaction mixture dissolved in an inert water-immiscible organic solvent and containing boron fluoride which comprises contacting said mixture with an aqueous solution of a salt of a strong mineral acid and potassium under such conditions that the potassium fluoborate is formed and precipitated, separating and drying the precipitate so formed and reacting the precipitate in admixture with boron oxide and sulfuric acid, whereby the boron fluoride is recovered.

5. The method for the recovery of boron fluoride from a water-insoluble polymerization reaction mixture dissolved in an inert water-immiscible organic solvent and containing boron fluoride which comprises contacting said mixture with an aqueous solution of potassium sulfate under such conditions that the potassium fluoborate is formed and precipitated, separating and drying the precipitate so formed and reacting the precipitate in admixture with boron oxide and sulfuric acid, whereby the boron fluoride is recovered.

6. The method for the recovery of boron fluoride from a water-insoluble polymerization reaction mixture dissolved in an inert water-immiscible organic solvent and containing boron fluoride which comprises contacting said mixture with an aqueous solution of potassium nitrate under such conditions that the potassium fluoborate is formed and precipitated, separating and drying the precipitate so formed and reacting the precipitate in admixture with boron oxide and sulfuric acid, whereby the boron fluoride is recovered.

7. The method for the recovery of boron fluoride from a water-insoluble polymerization reaction mixture dissolved in an inert water-immiscible organic solvent and containing boron fluoride which comprises contacting said mixture with an aqueous solution of potassium carbonate under such conditions that the potassium fluoborate is formed and precipitated, separating and drying the precipitate so formed and reacting the precipitate in admixture with boron oxide and sulfuric acid, whereby the boron fluoride is recovered.

8. The method for the recovery of boron fluoride from a water-insoluble polymerization mixture comprising boron fluoride and a material selected from the group consisting of rosins and rosin esters dissolved in an inert water-immiscible organic solvent which comprises contacting said mixture with an aqueous solution of a compound of a metal selected from the group consisting of potassium, rubidium and cesium capable of forming the fluoborate of the said metal under such conditions that the insoluble fluoborate of said metal is formed and precipitated, separating and drying the precipitate so formed and reacting the precipitate in admixture with boron oxide and sulfuric acid, whereby the boron fluoride is recovered.

9. The method for the recovery of boron fluoride from a water-insoluble polymerization reaction mixture dissolved in an inert water-immiscible organic solvent and containing boron fluoride which comprises contacting said mixture with an aqueous solution of a compound of a metal selected from the group consisting of potassium, rubidium and cesium capable of forming the fluoborate of the said metal under such conditions that the insoluble fluoborate of said metal is formed and precipitated, separating and drying the precipitate so formed and recovering boron fluoride from the dried precipitate.

ALFRED L. RUMMELSBURG.